(12) United States Patent
Guo et al.

(10) Patent No.: US 10,757,428 B2
(45) Date of Patent: Aug. 25, 2020

(54) LUMA AND CHROMA RESHAPING OF HDR VIDEO ENCODING

(71) Applicant: Apple Inc., Cupertino, CA (US)

(72) Inventors: Mei Guo, San Jose, CA (US); Jun Xin, Sunnyvale, CA (US); Jun Xu, Cupertino, CA (US); Yeping Su, Sunnyvale, CA (US); Chris Chung, Sunnyvale, CA (US); Xiaosong Zhou, Cupertino, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/156,193

(22) Filed: Oct. 10, 2018

(65) Prior Publication Data

US 2020/0120345 A1    Apr. 16, 2020

(51) Int. Cl.
| | |
|---|---|
| *H04N 19/33* | (2014.01) |
| *H04N 19/186* | (2014.01) |
| *H04N 19/51* | (2014.01) |
| *H04N 19/136* | (2014.01) |
| *H04N 19/12* | (2014.01) |

(52) U.S. Cl.
CPC .......... *H04N 19/186* (2014.11); *H04N 19/12* (2014.11); *H04N 19/136* (2014.11); *H04N 19/51* (2014.11)

(58) Field of Classification Search
CPC .... H04N 19/12; H04N 19/186; H04N 19/167; H04N 19/136; H04N 19/51; H04N 19/33; H04N 19/91
See application file for complete search history.

(56) References Cited

U.S. PATENT DOCUMENTS

| | | | |
|---|---|---|---|
| 8,437,053 B2 | 5/2013 | Edge | |
| 2017/0085881 A1 | 3/2017 | Atkins et al. | |
| 2017/0251211 A1 | 8/2017 | Froehlich et al. | |
| 2018/0007374 A1* | 1/2018 | Atkins | H04N 19/33 |
| 2018/0124399 A1* | 5/2018 | Su | H04N 19/91 |
| 2018/0131938 A1 | 5/2018 | Lu et al. | |

* cited by examiner

*Primary Examiner* — Obafemi O Sosanya

(74) *Attorney, Agent, or Firm* — BakerHostetler

(57) ABSTRACT

Systems and methods are disclosed for reshaping HDR video content to improve compression efficiency while using standard encoding/decoding techniques. Input HDR video frames, e.g., represented in an IPT color space, may be reshaped before the encoding/decoding process and the corresponding reconstructed HDR video frames may then be reverse reshaped. The disclosed reshaping methods may be combinations of scene-based or segment-based methods.

30 Claims, 8 Drawing Sheets

100

200

300

400

500

600

700

800

900

LUMA AND CHROMA RESHAPING OF HDR VIDEO ENCODING

BACKGROUND

The present disclosure refers to video capturing and compression techniques.

The advance in High Dynamic Range (HDR) display technologies and the growing availability of video content captured by HDR cameras both call for the development of more efficient methods of coding and delivery of HDR video content. HDR video, in contrast to the conventional Standard Dynamic Range (SDR) video, embodies an increased number of luminance and color levels, resulting in an improved viewing experience of video images that better resembles a real-word color gamut. However, the tradeoff is an increased challenge in delivery of HDR content—compression techniques have to encode more data to meet bandwidth and minimum video quality requirements. This challenge is especially acute for applications requiring low bitrate compression (e.g., those involving video streaming).

DETAILED DESCRIPTION

Figure 1:
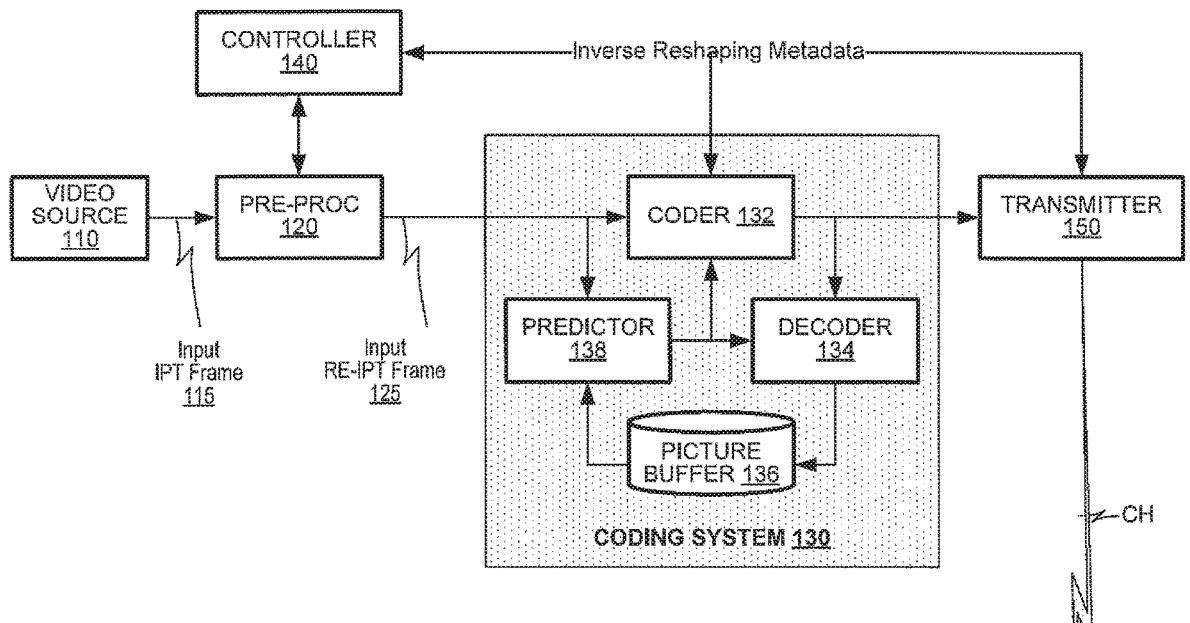
FIG. 1 is a functional block diagram illustrating components of a coding system according to an aspect of the present disclosure.

The YCbCr color space, commonly used to represent SDR video, is known to be limited with respect to its decorrelation capabilities, where mapping frames from an RGB color space into a YCbCr space does not provide full decorrelation of luminous and chroma information. Furthermore, a YCbCr color space is not modeled to match the Human Visual System (HVS). In contrast, an IPT (or the more recent variation ITP) color model is specifically designed to match the perceptual model of the HVS, and, thereby, any inevitable distortions introduced by compression are perceptually less disturbing. However, since already developed compression standards, e.g., High Efficiency Video coding (HEVC), are designed based on the YCbCr color space, reshaping techniques have been introduced. Generally, a reshaping technique maps the pixel values of HDR video frames from an IPT color space into a color space that is similar to the YCbCr color space before encoding, and then maps back the pixel values of the reconstructed frames into the IPT color space.

Aspects of the present disclosure describe systems and methods for reshaping HDR video to improve its compression efficiency while using standard encoding/decoding techniques. Hence, input video frames, represented in an original color space such as IPT, may be reshaped, before compression, into a color space such as YCbCr, and, then, after decompression, the corresponding reconstructed video frames may be reverse reshaped, resulting in reconstructed video frames represented in the original color space. Hence, methods disclosed herein may receive an input frame, comprising components of a color model. Then pixels of at least one component of those components may be reshaped according to a reshaping method, resulting in at least one reshaped component. The used reshaping method may comprise a reshaping ratio that increases as a function of a distance between a level of a pixel, of the pixels of the at least one component, and a neutral level. Likewise, the reshaping ratio may increase as a function of a distance between the spatial location of a pixel, of the pixels of the at least one component, and the spatial location of a focus-pixel, of the pixels of the at least one component.

Following reshaping, the video components, including the at least one reshaped component, may be coded by a motion compensated predictive coding technique. In an aspect, the used reshaping method may be based on coding parameters of the coding, such as the bitrate budget allocation. In another aspect, the coding parameters of the coding may be based on the used reshaping method.

In an aspect, if a received input frame is detected to be a first frame of a scene, the used reshaping method may be a scene-based reshaping method. Such a scene-based reshaping method may be determined based on analyses of one or more frames of the scene, including noise estimation, banding detection, or motion estimation. In an aspect, a range of pixel levels of the pixels may be partitioned into segments, and so the reshaping method may comprise of segment-based reshaping methods. Thus, each segment-based reshaping method is associated with a segment, of the segments, and may be used to reshape pixels that are at levels within the associated segment. Any reshaping method may be used as a segment-based reshaping method, for example, segment-based reshaping methods may be a piecewise linear function, a piecewise non-linear function, or a combination thereof.

An IPT (or ITP) color space has a different signal representation than a YCbCr color space. As mentioned above, to facilitate the encoding of IPT with codecs that were mainly designed for SDR-YCbCr, reshaping techniques may be utilized—wherein, for example, the values of video frames' pixels may be mapped from an IPT color space to a color space resembling the YCbCr color space. Such reshaping indirectly affects the allocation of codewords when encoding the reshaped pixels' luma and chroma components. Hence, according to aspects disclosed herein, HDR video that may be represented in an IPT color space: 1) may be reshaped into a reshaped IPT color space, namely RE-IPT, 2) may be encoded and decoded using encoding system 100 and decoding system 200 described below, and, then, 3) the reconstructed video may be reshaped back from the RE-IPT color space into the IPT color space. Herein, RE-IPT color space may be a color space similarly characterized as color spaces resembling or associated with the YCbCr color space.

Aspects disclosed in the present disclosure may optimize the bit-allocation employed by a video coding method by means of reshaping the video data representation. Accordingly, more codewords and/or higher bitrate may be granted to pixels with values within certain segments, or to certain video scenes, where coding artifacts are more noticeable by the HVS. For example, more codewords and/or higher bitrate may be granted to segments of the P and the T components that are closer to the neutral point or to brighter segments of the I component. Likewise, less codewords and/or low bitrate may be granted to segments of the P and the T components that are further away from the neutral point or to darker segments of the I component.

FIG. 1 is a functional block diagram illustrating components of a coding system according to an aspect of the present disclosure. Coding system 100 may include a video source 110, a pre-processor 120, a coding system 130, a controller 140, and a transmitter 150. Video source 110 may supply an input IPT frame 115 to be coded. Video source 110 may be provided as a camera that captures image data of a local environment, a storage device that stores video from some other source, an application executing on the coding system 100, or a network connection through which source video data is received. Preprocessor 120 may perform signal conditioning operations on the video to be coded to prepare the video data for coding. For example, preprocessor 120 may stabilize the video frames, alter the frame rate, alter the frame resolution, and/or modify other properties of the source video. Aspects herein disclose reshaping methods that may be carried out by preprocessor 120; the reshaping methods may map an input IPT frame 115, resulting in a reshaped input RE-IPT frame 125, as described in detail below. In an aspect, preprocessor 120 may not reshape or alter input frame IPT 115, in which case reshaped input RE-IPT frame 125 may be the same as input IPT frame 115. Controller 140 may set up the coding or operation parameters based on which system 100 operates. For example, controller 140 may control the operation modes of pre-processor 120, including controlling operations pertaining to the reshaping functionality. Controller 140 may, then, deliver those operation parameters, e.g., inverse reshaping metadata, to transmitter 150 to be included in the metadata packed with the coded video stream. Transmitter 150, then, outputs those metadata and coded video stream to a channel CH. That inverse reshaping metadata—including any information that may specify the inverse reshaping methods and related parameters—may be provided to decoder 200 via CH to allow the reverse reshaping operations after the video is reconstructed.

Coding system 130 may perform coding operations on the video to reduce its bandwidth. To that end, coding system 130 may exploit temporal and/or spatial redundancies within the source video. For example, coding system 130 may perform motion compensated predictive coding in which video frame or field frames are partitioned into sub-regions, e.g., pixel blocks, where each pixel blocks may be coded with respect to other predicted pixel blocks; the predicted pixel blocks may be derived from previously-coded video data. A given pixel block may be coded according to any one of a variety of predictive coding modes, such as: 1) intra-coding, in which an input pixel block is coded with respect to previously coded and decoded data of a common frame; 2) single prediction inter-coding, in which an input pixel block is coded with respect to data of a previously coded and decoded frame; and, 3) multi-hypothesis motion compensation predictive coding, in which an input pixel block is coded predictively using coded and decoded data from two or more sources, using temporal, spatial, or spatiotemporal predication.

The predictive coding modes may be used cooperatively with other coding techniques, such as Transform Skip coding, RRU coding, scaling of prediction sources, palette coding, and the like.

Coding system 130 may include a coder 132, a decoder 134, a picture buffer 136, and a predictor 138. Coder 132 may apply differential coding techniques to the input pixel block of reshaped input RE-IPT frame 125 using predicted pixel block data supplied by predictor 138. Decoder 134 may invert the differential coding techniques applied by coder 132 to a subset of coded frames designated as reference frames. Picture buffer 136 may store the reconstructed reference frames for use in prediction operations. Predictor 138 may predict data for input pixel blocks using the reference frames stored in picture buffer 136. Coding system 130 typically operates according to a predetermined coding protocol such as the well-known High Efficiency Video Coding ("HEVC") coding protocol.

Figure 2:
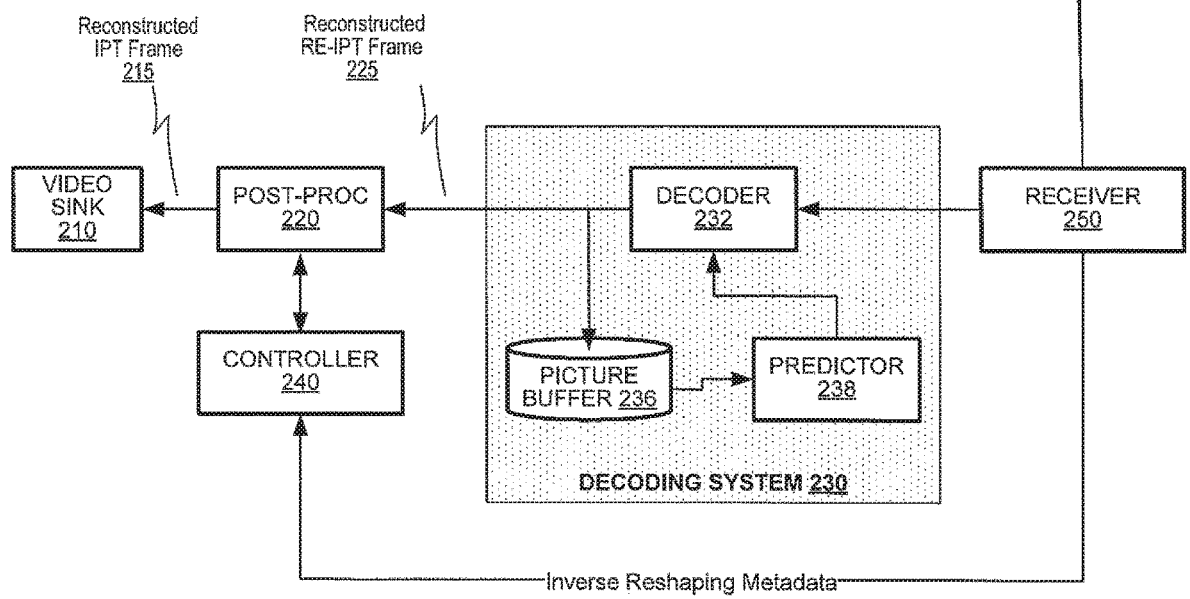
FIG. 2 is a functional block diagram illustrating components of a decoding system according to an aspect of the present disclosure.

FIG. 2 is a functional block diagram illustrating components of a decoding system 200 according to an aspect of the present disclosure. Decoding system 200 may include a receiver 250 to receive the coded video stream from channel CH, a controller 240, a decoding system 230 that decodes the coded video, a post-processor 220, and a video sink 210 that consumes the reconstructed video data.

Receiver 250 may receive the coded video stream from CH and may route components of the data stream to appropriate units of system 200. Although FIGS. 1 and 2 illustrate functional units of video coding and decoding systems, such systems often will include coding and decoding functionality for audio data associated with the video and perhaps other processing units (not shown). Thus, receiver 250 may parse the coded video stream and its metadata from other elements of the data stream and then may route the coded video stream to video decoder 230, and the metadata, such as inverse reshaping metadata, to controller 240.

Decoder system 230 may perform decoding operations that invert coding operations performed by coding system 130. Decoder system 230 may include a decoder 232, a picture buffer 236, and a predictor 238. Decoder 232 may invert the differential coding techniques applied by coder 132 to the coded frames. Picture buffer 236 may store reconstructed reference frames for use in prediction operations. Predictor 238 may predict data for input pixel blocks using the reconstructed reference frames according to prediction parameters supplied by the metadata packed with the coded video stream. Decoder 232 may operate according to the same coding protocol as the encoder, such as the well-known High Efficiency Video Coding ("HEVC") coding protocol.

Post-processor 220 may perform operations to condition the reconstructed video data for display. For example, post-processor 220 may perform various filtering operations (e.g., de-blocking, de-ringing filtering, and the like), which may obscure visual artifacts in the reconstructed video that may be generated by the coding/decoding process. Post-processor 330 may also alter the frame resolution and/or the frame rate of the reconstructed video to conform it to requirements of video sink 210. In aspects of the present disclosure, and according to the received inverse reshaping metadata, post-processor 220 may reshape back the RE-IPT components of reconstructed RE-IPT frame 255 into IPT components, resulting in reconstructed IPT frame 215. Alternatively, post-processor 220 may not reshape back the RE-IPT components of reconstructed RE-IPT frame 255, in which case reconstructed IPT frame 215, in FIG. 2, may be identical to reconstructed IPT Frame 215.

Video sink 210 represents various hardware and/or software components in decoding system 200 that may consume reconstructed IPT frame 215. Video sink 210 typically may include one or more display devices on which reconstructed video may be rendered. Alternatively, video sink 210 may be represented by a memory system that stores the reconstructed video for later use. Video sink 210 may also include one or more application programs that further process the reconstructed video data. In some aspects, video sink 210 may represent a transmission system that further transmits the reconstructed video to another systems, separate from decoding system 200.

Figure 3:
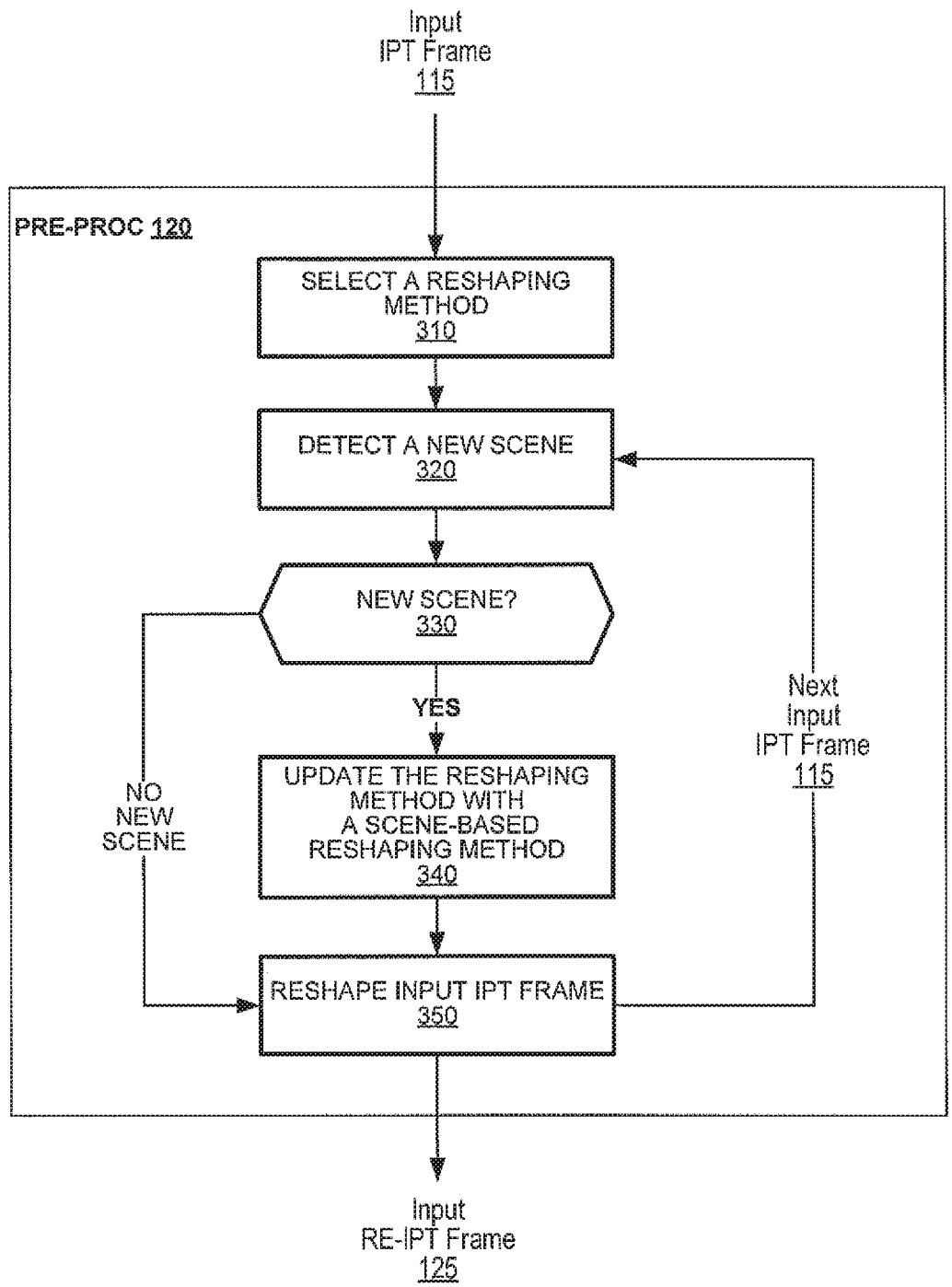
FIG. 3 is a functional block diagram of a method for the reshaping of input video frames according to an aspect of the present disclosure.

FIG. 3 illustrates a flow diagram of an example process, which may be carried out by preprocessor 120, for reshaping input IPT frames into input RE-IPT frames according to aspects disclosed herein. Accordingly, in step 310, the process begins with selecting a reshaping method, including selecting one of several reshaping methods disclosed herein. Then, in step 320, a scene detection operation may be employed to detect whether input IPT frame 115 begins a new scene in the video sequence. If no new scene had been detected, the process may proceed to step 350 where reshaping of input IPT frame 115 may be carried out. If a new scene is detected, in step 340, the process may update the current reshaping method with a new scene-based reshaping method. It may only update the reshaping parameter or may determine that reshaping should not be applied at all. Thus, for each scene, the decision whether to reshape, and, if so, what reshaping method and parameters to use, may be determined based on analyses of that scene. For example, such analyses may include noise estimation, banding detection, or motion estimation. Note that the processes of scene detection and scene analyses may be performed on more than one frame (i.e., the first frame of a scene), and, therefore, may require buffering of several input IPT frames. Once, the reshaping method and/or the reshaping parameters may have been updated in step 340, input IPT frame 115 may be reshaped accordingly in step 350. Alternatively, following the selection of a reshaping method and parameters in step 310, the process may proceed directly to the reshaping operation in step 350. The reverse reshaping parameters, corresponding to the reshaping method and parameters used for the reshaping of each scene or input IPT frame, may be stored in the metadata associated with that each scene or each input IPT frame to be packed with the coded video stream.

Figure 4:
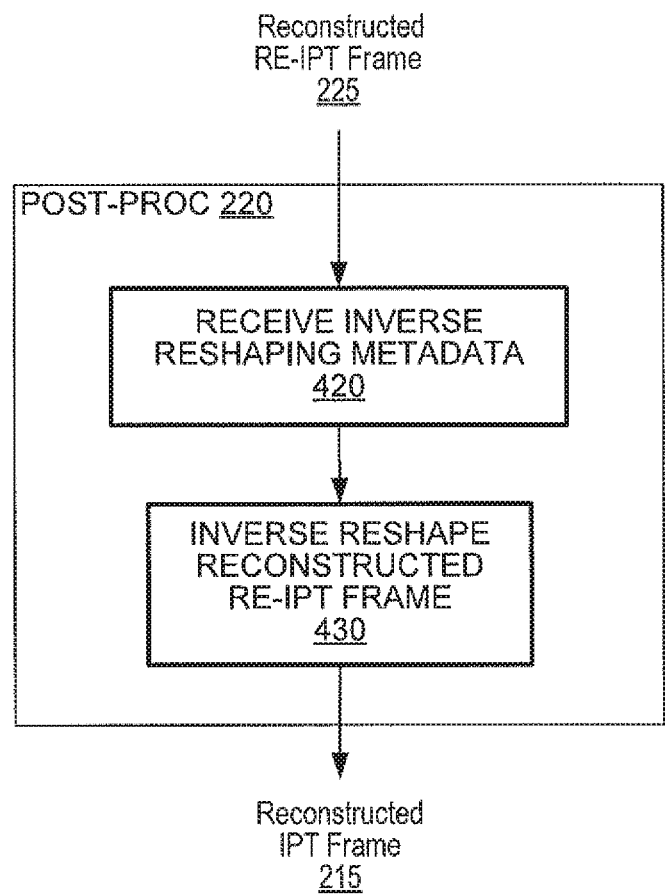
FIG. 4 is a functional block diagram of a method for the reverse reshaping of the reconstructed video frames according to an aspect of the present disclosure.

FIG. 4 illustrates a flow diagram of an example process which may be carried out by post-processor 220 for inverse reshaping of reconstructed RE-IPT frames into reconstructed IPT frames, according to aspects disclosed herein. In step 420, the inverse reshaping metadata may be parsed to determine what inverse reshaping method and what related parameters should be use to reshape back reconstructed RE-IPT frame 225 to reconstructed IPT frame 215. Then, in step 430, the reshaping operation that may be carried out in step 360 may be reversed by employing the parsed inverse reshaping method.

Figure 5:
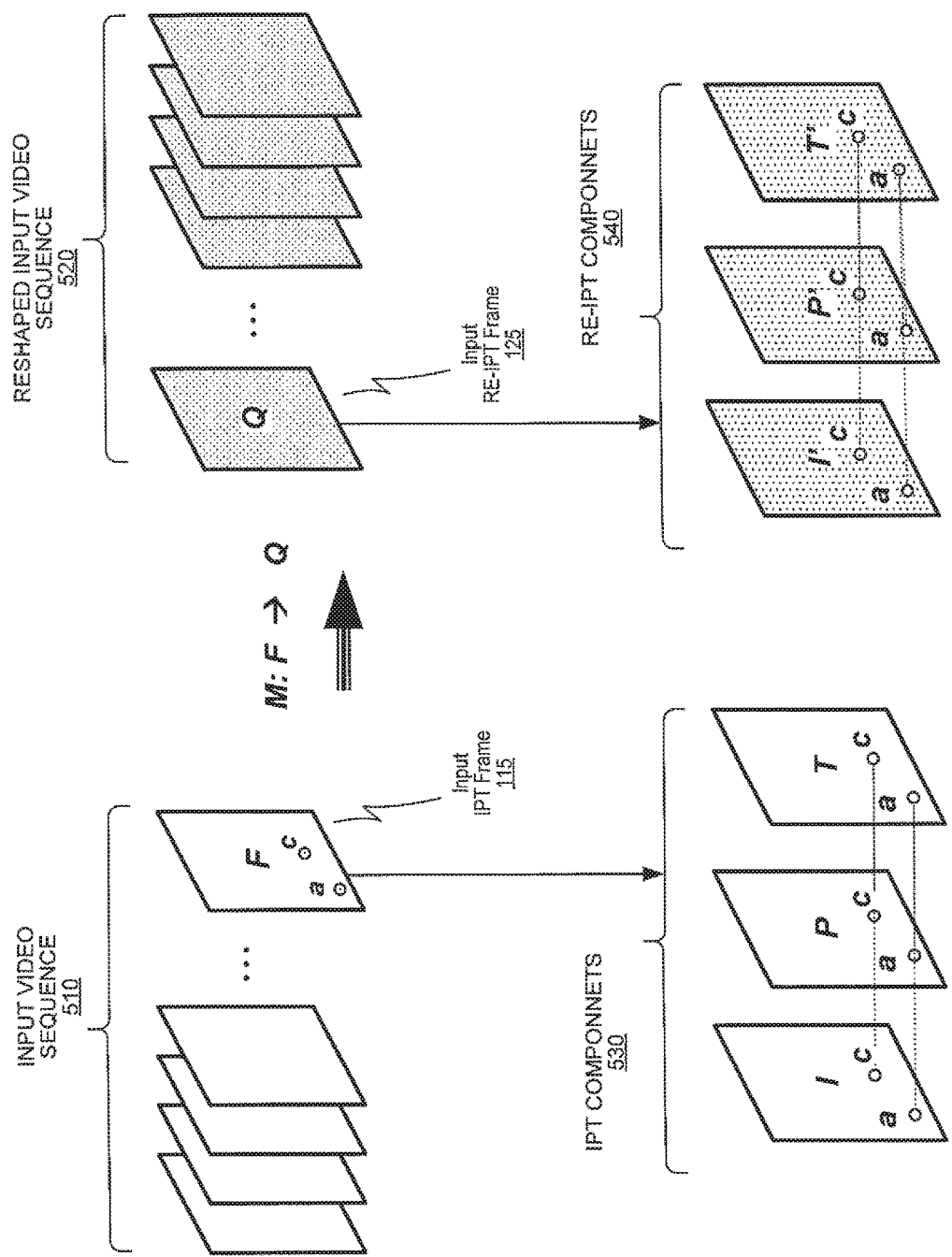
FIG. 5 is a diagram illustrating the reshaping of IPT components into RE-IPT components according to an aspect of the present disclosure.

FIG. 5 illustrates the reshaping of input video sequence 510 (including input IPT frame 115) into reshaped input video sequence 520 (including input RE-IPT frame 125) that may take place in preprocessor 120. In an aspect, the pixels of input IPT frame 115 may be represented in an IPT color space. Thus, as shown in FIG. 5, each input frame F may be represented by component I (brightness level), component P (red-green level), and component T (blue-yellow level), denoted herein as F=[I, P, T]. Notice that reshaping operations that are described herein with respect to F may be uniformly or specifically defined or applied with respect to each of the IPT components. Referencing FIG. 5, a reshaping function M may be used to map a pixel value, F(a), within a range of $[f_{min}, f_{max})$, into a corresponding pixel value Q(a), within a modified range of $[q_{min}, q_{max})$. M may be formally expressed as follows:

$$M:F(a) \rightarrow Q(a), F \in [f_{min}, f_{max}), Q \in [q_{min}, q_{max}),$$

where a may denote a pixel's spatial location within frame F (and by extension within the IPT components), as illustrated in FIG. 5. As mentioned above, M may be different for each component I, P, and T—i.e., $M=[M_I, M_P, M_T]$. Similarly, the pixel value ranges may be different for each component I, P, and T—i.e., $$[f_{min}, f_{max}) = [[f_{min}, f_{max})_I, [f_{min}, f_{max})_P, [f_{min}, f_{max})_T], \text{ and}$$

$$[q_{min}, q_{max}) = [[q_{min}, q_{max})_I, [q_{min}, q_{max})_P, [q_{min}, q_{max})_T].$$

Hence, following the reshaping of frame F=[I, P, T] into Q=[I', P', T'], the reshaped frame Q may be fed into coding system 130. At decoding system 230, the reconstructed frame $\hat{Q}$ (i.e., reconstructed RE-IPT frame 225) is converted back into a reconstructed frame $\hat{F}$ (i.e., reconstructed IPT frame 215) using $M^{-1}$, an inverse-reshaping function. $M^{-1}$ may be formally expressed as follows:

$$M^{-1}:\hat{Q}(a) \rightarrow F(a), \hat{Q} \in [q_{min}, q_{max}), F \in [f_{min}, f_{max}),$$

Metadata that specifies inverse reshaping function $M^{-1}$ (or alternatively reshaping function M)—namely inverse reshaping metadata—may be packed with the coded video stream, and may be used at the decoder side for the inverse-reshaping process.

Figure 6:
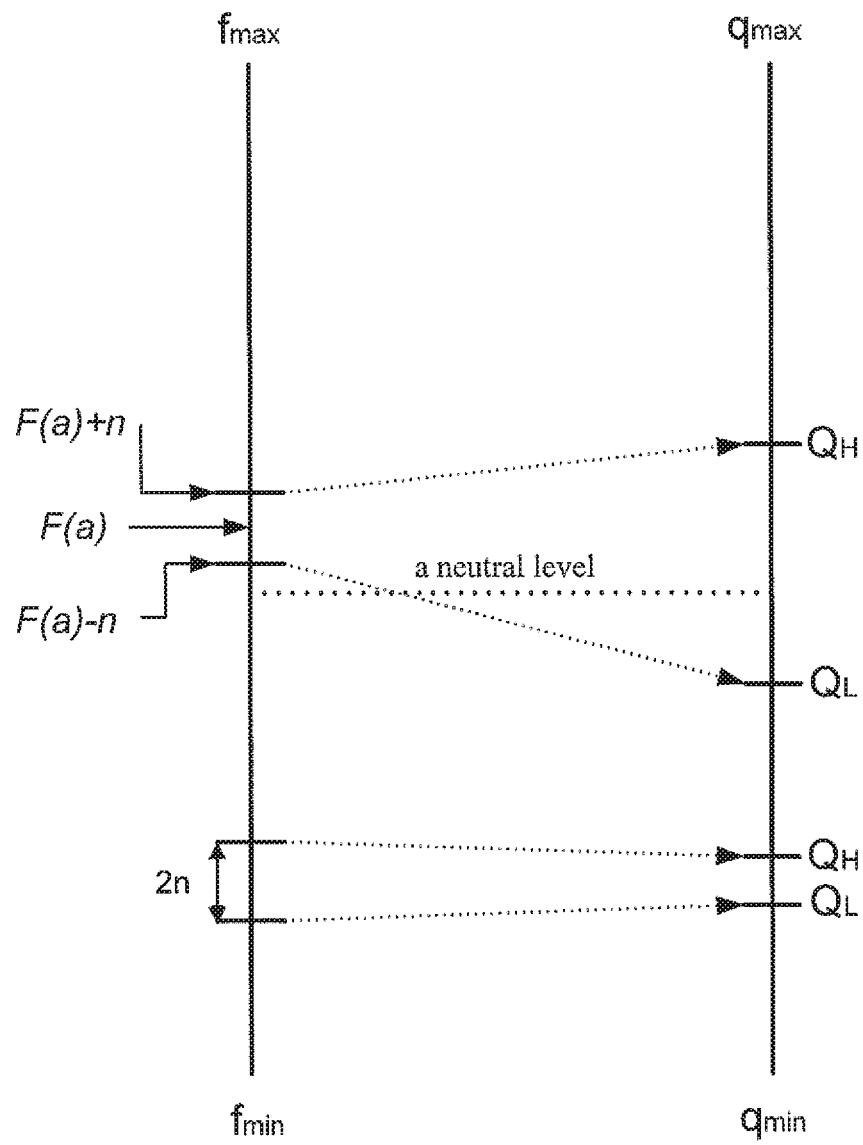
FIG. 6 is a diagram illustrating a reshaping ratio of a reshaping method according to an aspect of the present disclosure.

FIG. 6 shows a method of reshaping according to an aspect of this disclosure. Assuming a pixel value of F(a)−n is mapped into a pixel value of $Q_L$, and a pixel value of F(a)+n is mapped into a pixel value of $Q_H$, as illustrated in FIG. 6. A reshaping ratio may be defined as:

$$\text{Ratio} \equiv \frac{Q_H - Q_L}{2n}.$$

According to this method, then, the reshaping ratio, Ratio, may be increased as the distance between a pixel value F(a) and a neutral level gets smaller. An implication of such a method may be that a pixel level Q(a) that is closer to the neutral level may be represented with more codewords compared to a pixel level Q(a) that is farther from the neutral level.

The method described above may also be applied spatially, where the reshaping ratio, Ratio, may be increased as the distance between location a of a pixel and the location of a focus-pixel c gets smaller, as shown in FIG. 5. Similarly, an implication of such a method may be that a pixel Q(a±c) may be represented with more codewords as |a−c| becomes smaller. In an aspect, c may be determined as the location of the focus of attention in a video sequence, and be dynamically changing as the focus of attention shifts with time across the video frames. For example, c may be positioned at the vicinity of a talking-head or in a region in the video with high texture, motion, or luminance. In another aspect, more than one focus-pixel may be defined.

In an aspect, the reshaping ratio, Ratio, may be a function of the bitrate budget allocation of a scene, of a frame, or of regions within a frame. For example, preprocessor 120 may receive information regarding the bitrate budget allocation or any other coding parameters from controller 140. Controller 140, in turn, may receive such information from coding system 130. Based on that information, preprocessor 120 may determine what method of reshaping to use, the reshaping ratio, or any other related parameters. In another aspect, coding system 130 may receive information related to the shaping method in use and may determine its bitrate budget allocation based on that information.

Figure 7:
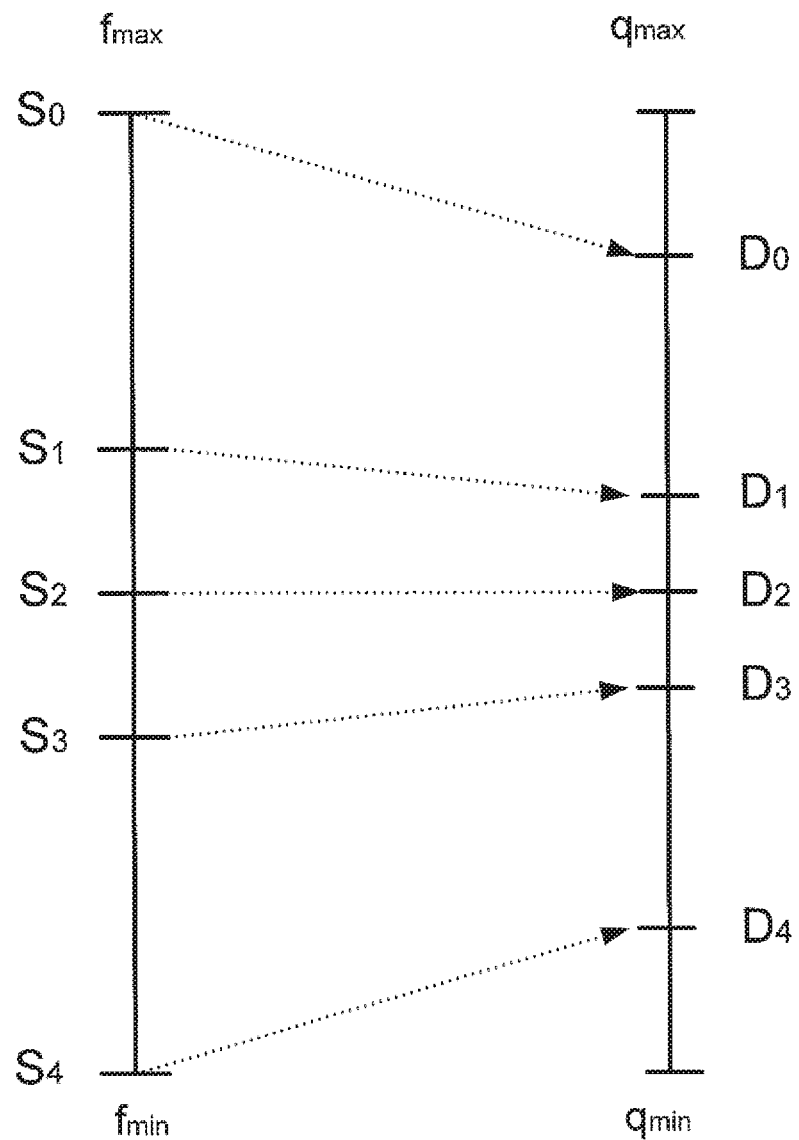
FIG. 7 is a diagram illustrating a segment-based reshaping method according to an aspect of the present disclosure.

FIG. 7 shows a segment-based reshaping method according to an aspect of this disclosure. As illustrated in FIG. 7, such a segment-based method may employ a piece-wise reshaping function. Thus, for example, the range $[f_{min}, f_{max})$ of F may be partitioned into four segments: $[S_0, S_1), [S_1, S_2), [S_2, S_3)$, and $[S_3, S_4)$. Then, the four segments may each be mapped by M into four corresponding segments that partition the modified range of $[q_{min}, q_{max})$, denoted as $[D_0, D_1), [D_1, D_2), [D_2, D_3)$, and $[D_3, D_4)$. In such case, M may be defined as: $M=\{M_1, M_2, M_3, M_4\}$, where each function element may be expressed as:

$$M_i: F(a) \rightarrow Q(a), F \in [S_i, S_{i+1}), Q \in [D_i, D_{i+1}).$$

Likewise, $M^{-1} = \{M_1^{-1}, M_1^{-1}, M_3^{-1}, M_4^{-1}\}$, where each function element may be expressed as:

$$M_i^{-1}: \hat{Q}(a) \rightarrow F(a), \hat{Q} \in [D_i, D_{i+1}), F \in [S_i, S_{i+1}).$$

As mentioned above, information that specifies inverse reshaping function $M^{-1} = \{M_1^{-1}, M_1^{-1}, M_3^{-1}, M_4^{-1}\}$, (or alternatively reshaping function $M = \{M_1, M_2, M_3, M_4\}$,) may be packed as inverse reshaping metadata with the coded video stream, and may be used at the decoder side for the inverse-reshaping process.

Table 1 provides an example of a segment-based reshaping method—a piecewise-linear inverse-reshaping function that may be applied to the $\hat{P}$ component of $Q$, i.e., reconstructed RE-IPT frame 225. However, the reshaping function elements, $M_i$, and, thereby, the corresponding inverse reshaping function elements, $M_i^{-1}$, may each be a linear function, a nonlinear function, or a combination thereof. Note that in the example of Table 1, pixel values are normalized to [0, 1).

TABLE 1

A piecewise-linear inverse-reshaping function for the $\hat{P}$ component of $\hat{Q}$.

| Segment | $S_i$ | $S_{i+1}$ | $D_i$ | $D_{i+1}$ | $M_i^{-1}$ |
|---|---|---|---|---|---|
| 0 | 0 | 0.41 | 0.29 | 0.43 | $\hat{P} = \hat{Q}*2.77 - 0.79$ |
| 1 | 0.41 | 0.5 | 0.43 | 0.5 | $\hat{P} = \hat{Q}*1.36 - 0.18$ |
| 2 | 0.5 | 0.57 | 0.5 | 0.55 | $\hat{P} = \hat{Q}*1.37 - 0.19$ |
| 3 | 0.57 | 1.0 | 0.55 | 0.71 | $\hat{P} = \hat{Q}*2.78 - 0.1$ |

In an aspect, the luminous component I is mapped from its Perceptive Quantization (PQ) form to a certain visually (perceptually) uniform reference. Table 2 provides an example of a piecewise-linear inverse-reshaping function that may be applied to component $\hat{I}$.

TABLE 2

A piecewise-linear inverse-reshaping function for component $\hat{I}$.

| Segment | $S_i$ | $S_{i+1}$ | $D_i$ | $D_{i+1}$ | $M_i^{-1}$ |
|---|---|---|---|---|---|
| 0 | 0.0 | 0.12 | 0.06 | 0.14 | $\hat{P} = \hat{Q}*1.60 - 0.10$ |
| 1 | 0.12 | 0.25 | 0.14 | 0.23 | $\hat{P} = \hat{Q}*1.45 - 0.08$ |
| 2 | 0.25 | 0.37 | 0.23 | 0.31 | $\hat{P} = \hat{Q}*1.47 - 0.09$ |
| 3 | 0.37 | 0.5 | 0.31 | 0.40 | $\hat{P} = \hat{Q}*1.41 - 0.07$ |
| 4 | 0.5 | 0.62 | 0.40 | 0.50 | $\hat{P} = \hat{Q}*1.22 + 0.01$ |
| 5 | 0.62 | 0.75 | 0.50 | 0.63 | $\hat{P} = \hat{Q}*0.99 + 0.12$ |
| 6 | 0.75 | 0.87 | 0.63 | 0.77 | $\hat{P} = \hat{Q}*0.88 + 0.20$ |
| 7 | 0.87 | 1.0 | 0.77 | 0.92 | $\hat{P} = \hat{Q}*0.86 + 0.21$ |

Reshaping methods described in the present disclosure may be employed relative to a Region of Interest (ROI), where an ROI may be spatial (e.g., encompassing a group of pixels within a video frame), temporal (e.g., encompassing a group of corresponding pixels across video frames), or spatiotemporal (e.g., encompassing a volumetric pixel block). Alternatively, an ROI may be defined to include one or more pixel blocks, frames, or slices, or may be defined to include Largest Coding Units ("LCU") or Coding Tree Units ("CTU"). Hence, the reshaping method used may be activated or deactivated for each defined ROI. Alternatively, different reshaping methods or modes may be employed within and outside an ROI. For example, when ROIs are associated with tiles or LCUs, information may be coded and packed with the coded video stream to indicate whether and what reshaping methods were employed.

Figure 8:
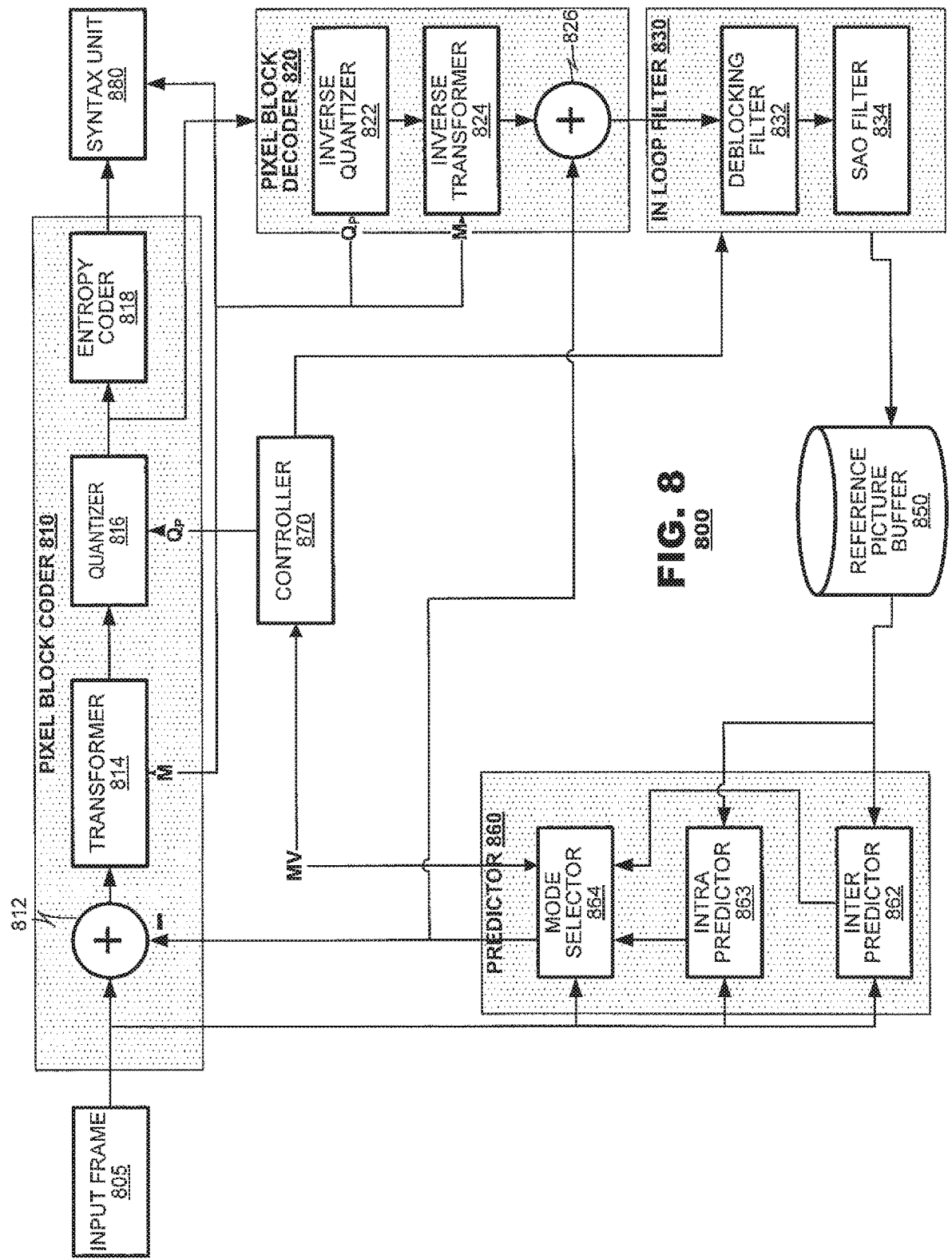
FIG. 8 is a functional block diagram of a coding system according to an aspect of the present disclosure.

FIG. 8 is a functional block diagram of a coding system 800 according to an aspect of the present disclosure. System 800 may include a pixel block coder 810, a pixel block decoder 820, an in loop filter 830, a reference picture buffer 850, a predictor 860, a controller 870, and a syntax unit 880. Predictor 860 may predict image data for use during coding of a newly-presented input frame 805; it may supply an estimate for each pixel block of the input frame 805 based on one or more reference pixel blocks retrieved from reference picture buffer 850. Pixel block coder 810 may then code the difference between each input pixel block and its predicted pixel block applying differential coding techniques, and may present the coded pixel blocks (i.e., coded frame) to syntax unit 880. Syntax unit 880 may pack the presented coded frame together with the used coding parameters into a coded video data stream that conforms to a governing coding protocol. The coded frame is also presented to decoder 820. Decoder 820 may decode the coded pixel blocks of the coded frame, generating decoded pixel blocks that together constitute a reconstructed frame. Next, in loop filter 830 may perform one or more filtering operations on the reconstructed frame that may address artifacts introduced by the coding 810 and decoding 820 processes. Reference picture buffer 850 may store the filtered frames obtained from in loop filter 830. These stored reference frames may be used by predictor 860 in the prediction of later-received pixel blocks.

Pixel block coder 810 may include a subtractor 812, a transformer 814, a quantizer 816, and an entropy coder 818. Pixel block coder 810 may receive pixel blocks of input frame 805 at subtractor 812 input. Subtractor 812 may subtract the received pixel blocks from their corresponding predicted pixel blocks provided by predictor 860, or vise versa. This subtraction operation may result in residual pixel blocks, constituting a residual frame. Transformer 814 may transform the residual pixel blocks—mapping each pixel block from its pixel domain into a transform domain, and resulting in transform blocks each of which consists of transform coefficients. Following transformation 816, quantizer 816 may quantize the transform blocks' coefficients. Entropy coder 818 may then further reduce the bandwidth of the quantized transform coefficients using entropy coding, for example by using variable length code words or by using a context adaptive binary arithmetic coder.

Transformer 814 may utilize a variety of transform modes, M, as may be determined by the controller 870. Generally, transform based coding reduces spatial redundancy within a pixel block by compacting the pixels' energy into fewer transform coefficients within the transform block, allowing the spending of more bits on high energy coefficients while spending fewer or no bits at all on low energy coefficients. For example, transformer 814 may apply transformation modes such as a discrete cosine transform ("DCT"), a discrete sine transform ("DST"), a Walsh-Hadamard transform, a Haar transform, or a Daubechies wavelet transform. In an aspect, controller 870 may: select a transform mode M to be applied by transformer 814; configure transformer 814 accordingly; and record, either expressly or impliedly, the coding mode M in the coding parameters.

Quantizer 816 may operate according to one or more quantization parameters, $Q_P$, and may apply uniform or non-uniform quantization techniques, according to a setting that may be determined by the controller 870. In an aspect, the quantization parameter $Q_P$ may be a vector. In such a case, the quantization operation may employ a different quantization parameter for each transform block and each coefficient or group of coefficients within each transform block.

Entropy coder 818 may perform entropy coding on quantized data received from quantizer 816. Typically, entropy coding is a lossless process, i.e., the quantized data may be perfectly recovered from the entropy coded data. Entropy coder 818 may implement entropy coding methods such as run length coding, Huffman coding, Golomb coding, or Context Adaptive Binary Arithmetic Coding.

Figure 9:
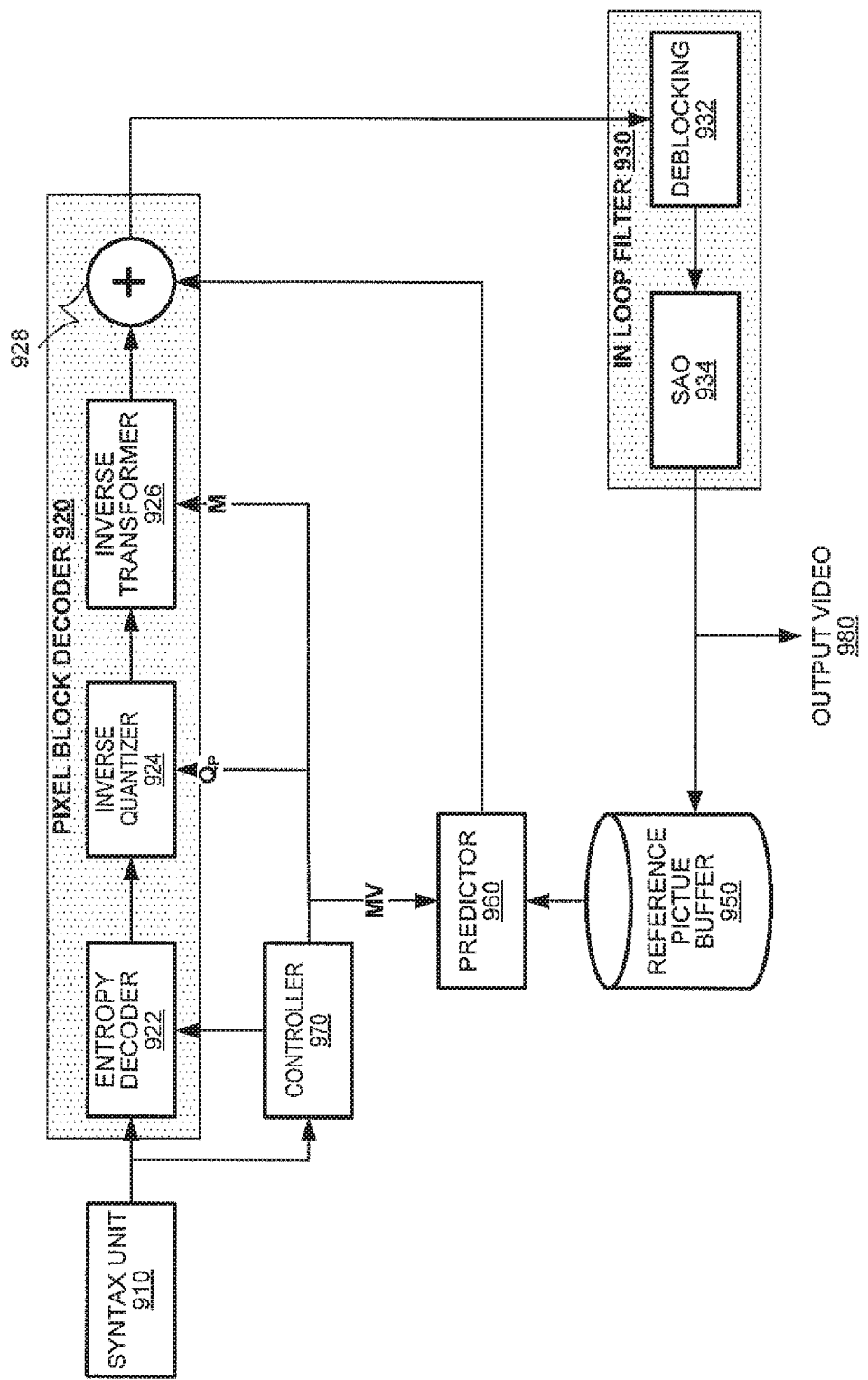
FIG. 9 is a functional block diagram of a decoding system according to an aspect of the present disclosure.

As described above, controller 870 may set coding parameters that are required to configure the pixel block coder 810, including parameters of transformer 814, quantizer 816, and entropy coder 818. Coding parameters may be packed together with the coded residuals into a coded video data stream to be available for a decoder 900 (FIG. 9). These coding parameters may also be made available for decoder 820 in the coder system 800—making them available to inverse quantizer 822 and inverse transformer 824.

A video coder 800 that relies on motion compensated predictive coding techniques may include a decoding functionality 820 in order to generate the reference frames used for predictions by predictor 860. This permits coder 800 to produce the same predicted pixel blocks in 860 as the decoder's in 960. Generally, the pixel block decoder 820 inverts the coding operations of the pixel block coder 810. For example, the pixel block decoder 820 may include an inverse quantizer 822, an inverse transformer 824, and an adder 826. Decoder 820 may take its input data directly from the output of quantizer 816, because entropy coding 818 is a lossless operation. Inverse quantizer 822 may invert operations of quantizer 816, performing a uniform or a non-uniform de-quantization as specified by $Q_P$. Similarly, inverse transformer 824 may invert operations of transformer 814 using a transform mode as specified by M. Hence, to invert the coding operation, inverse quantizer 822 and inverse transformer 824 may use the same quantization parameters $Q_P$ and transform mode M as their counterparts in the pixel block coder 810. Note that quantization is a lossy operation, as the transform coefficients are truncated by quantizer 816 (according to $Q_P$), and, therefore, these coefficients' original values cannot be recovered by dequantizer 822, resulting in coding error—a price paid to obtain video compression.

Adder 826 may invert operations performed by subtractor 812. Thus, the inverse transformer's output may be a coded/decoded version of the residual frame outputted by subtractor 812, namely a reconstructed residual frame. That reconstructed residual frame may be added 826 to the predicted frame, provided by predictor 860 (typically, the same predicted frame predictor 860 provided to subtractor 812 for the generation of the residual frame at the subtractor output). Hence, adder 826 may result in a coded/decoded version of input frame 805, namely a reconstructed input frame.

Hence, adder 826 may provide the reconstructed input frame to in loop filter 830. In loop filter 830 may perform various filtering operations on the reconstructed input frame, inter alia, to mitigate artifacts generated by independently processing data from different pixel blocks, as may be carried out by transformer 814, quantizer 816, inverse quantizer 822, and inverse transformer 824. Hence, in loop filter 830 may include a deblocking filter 832 and a sample adaptive offset ("SAO") filter 834. Other filters performing adaptive loop filtering ("ALF"), maximum likelihood ("ML") based filtering schemes, deringing, debanding, sharpening, resolution scaling, and other such operations may also be employed by in loop filter 830. As discussed above, filtered reconstructed input frames provided by in loop filter 830 may be stored in reference picture buffer 850.

Predictor 860 may base pixel block prediction on previously coded/decoded pixel blocks, accessible from the reference data stored in 850. Prediction may be accomplished according to one of multiple prediction modes that may be determined by mode selector 864. For example, in an intra-prediction mode the predictor may use previously coded/decoded pixel blocks from the same currently coded input frame to generate an estimate for a pixel block from that currently coded input frame. Thus, reference picture buffer 850 may store coded/decoded pixel blocks of an input frame it is currently coding. In contrast, in an inter-prediction mode the predictor may use previously coded/decoded pixel blocks from previously coded/decoded frames to generate an estimate for a pixel block from a currently coded input frame. Reference picture buffer 850 may store these coded/decoded reference frames.

Hence, predictor 860 may include an inter predictor 862, an intra predictor 863, and a mode selector 864. Inter predictor 862 may receive an input pixel block of new input frame 805 to be coded. To that end, the inter predictor may search reference picture buffer 850 for matching pixel blocks to be used in predicting that input pixel block. On the other hand, intra predictor 863 may search reference picture buffer 850, limiting its search to matching reference blocks belonging to the same input frame 805. Both inter predictor 862 and intra predictor 863 may generate prediction metadata that may identify the reference frame(s) (reference frame identifier(s)) and the locations of the used matching reference blocks (motion vector(s)).

Mode selector 864 may determine a prediction mode or select a final prediction mode. For example, based on prediction performances of inter predictor 862 and intra predictor 863, mode selector 864 may select the prediction mode (e.g., inter or intra) that results in a more accurate prediction. The predicted pixel blocks corresponding to the selected prediction mode may then be provided to subtractor 812, based on which subtractor 812 may generate the residual frame. Typically, mode selector 864 selects a mode that achieves the lowest coding distortion given a target bitrate budget. Exceptions may arise when coding modes are selected to satisfy other policies to which the coding system 800 may adhere, such as satisfying a particular channel's behavior, or supporting random access, or data refresh policies. In an aspect, a multi-hypothesis-prediction mode may be employed, in which case operations of inter predictor 862, intra predictor 863, and mode selector 864 may be replicated for each of a plurality of prediction hypotheses.

Controller 870 may control the overall operation of the coding system 800. Controller 870 may select operational parameters for pixel block coder 810 and predictor 860 based on analyses of input pixel blocks and/or based on external constraints, such as coding bitrate targets and other operational parameters. For example, mode selector 864 may output the prediction modes and the corresponding prediction metadata, collectively denoted by MV, to controller 870. Controller 870 may then store the MV parameters with the other coding parameters, e.g., M and $Q_P$, and may deliver those coding parameters to syntax unit 880 to be packed with the coded residuals.

During operation, controller 870 may revise operational parameters of quantizer 816, transformer 815, and entropy coder 818 at different granularities of a video frame, either on a per pixel block basis or at a larger granularity level (for example, per frame, per slice, per Largest Coding Unit ("LCU"), or per Coding Tree Unit ("CTU")). In an aspect, the quantization parameters may be revised on a per-pixel basis within a coded frame. Additionally, as discussed, controller 870 may control operations of decoder 820, in loop filter 830, and predictor 860. For example, predictor 860 may receive control data with respect to mode selection, including modes to be tested and search window sizes. In loop filter 830 may receive control data with respect to filter selection and parameters.

FIG. 9 is a functional block diagram of a decoding system 900 according to an aspect of the present disclosure. Decoding system 900 may include a syntax unit 910, a pixel block decoder 920, an in loop filter 930, a reference picture buffer 950, a predictor 960, and a controller 970.

Syntax unit 910 may receive a coded video data stream and may parse this data stream into its constituent parts, including data representing the coding parameters and the coded residuals. Data representing coding parameters may be delivered to controller 970, while data representing the coded residuals (the data output of pixel block coder 810 in FIG. 8) may be delivered to pixel block decoder 920. Predictor 960 may predict pixel blocks from reference frames available in reference picture buffer 950 using the reference pixel blocks specified by the prediction metadata, MV, provided in the coding parameters. Those predicted pixel blocks may be provided to pixel block decoder 920. Pixel block decoder 920 may produce a reconstructed video frame, generally, by inverting the coding operations applied by pixel block coder 810 in FIG. 8. In loop filter 930 may filter the reconstructed video frame. The filtered reconstructed video frame may then be outputted from decoding system 900. If a frame of those filtered reconstructed video frame is designated to serve as a reference frame, then it may be stored in reference picture buffer 950.

Collaboratively with pixel block coder 810 in FIG. 8, and in reverse order, pixel block decoder 920 may include an entropy decoder 922, an inverse quantizer 924, an inverse transformer 926, and an adder 928. Entropy decoder 922 may perform entropy decoding to invert processes performed by entropy coder 818. Inverse quantizer 924 may invert the quantization operation performed by quantizer 816. Likewise, inverse transformer 926 may invert operations of transformer 814. Inverse quantizer 924 may use the quantization parameters $Q_P$ provided by the coding parameters parsed from the coded video stream. Similarly, inverse transformer 926 may use the transform modes M provided by the coding parameters parsed from the coded video stream. Typically, the quantization operation is the main contributor to coding distortions—a quantizer truncates the data it quantizes, and so the output of inverse quantizer 924, and, in turn, the reconstructed residual blocks at the output of inverse transformer 926 possess coding errors when compared to the input presented to quantizer 816 and transformer 814, respectively.

Adder 928 may invert the operation performed by subtractor 812 in FIG. 8. Receiving predicted pixel blocks from predictor 960, adder 928 may add these predicted pixel blocks to the corresponding reconstructed residual pixel blocks provided at the inverse transformer output 926. Thus, the adder may output reconstructed pixel blocks (constituting a reconstructed video frame) to in loop filter 930.

In loop filter 930 may perform various filtering operations on the received reconstructed video frame as specified by the coding parameters parsed from the coded video stream. For example, in loop filter 930 may include a deblocking filter 932 and a sample adaptive offset ("SAO") filter 934. Other filters performing adaptive loop filtering ("ALF"), maximum likelihood ("ML") based filtering schemes, deringing, debanding, sharpening, resolution scaling. Other like operations may also be employed by in loop filter 930. In this manner, the operation of in loop filter 930 may mimic the operation of its counterpart in loop filter 830 of coder 800. Thus, in loop filter 930 may output a filtered reconstructed video frame—i.e., output video 980. As discussed above, output video 980 may be consumed (e.g., displayed, stored, and/or processed) by the decoder's 900 hosting target terminal and/or further transmitted to another terminal.

Reference picture buffer 950 may store reference video frames, such as the filtered reconstructed video frames provided by in loop filter 930. Those reference video frames may be used in later predictions of other pixel blocks. Thus, predictor 960 may access reference pixel blocks from reference picture buffer 950, and may retrieve those reference pixel blocks specified in the prediction metadata. The prediction metadata may be part of the coding parameters parsed from the coded video stream. Predictor 960 may then perform prediction based on those reference pixel blocks and may supply the predicted pixel blocks to decoder 920.

Controller 970 may control overall operations of coding system 900. The controller 970 may set operational parameters for pixel block decoder 920 and predictor 960 based on the coding parameters parsed from the coded video stream. These operational parameters may include quantization parameters, $Q_P$, for inverse quantizer 924, transform modes, M, for inverse transformer 926, and prediction metadata, MV, for predictor 960. The coding parameters may be set at various granularities of a video frame, for example, on a per pixel block basis, a per frame basis, a per slice basis, a per LCU basis, a per CTU basis, or based on other types of regions defined for the input image.

The foregoing discussion has described operations of the aspects of the present disclosure in the context of video coders and decoders. Commonly, these components are provided as electronic devices. Video decoders and/or controllers can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs are typically stored in physical storage media such as electronic-based, magnetic-based storage devices, and/or optically-based storage devices, where they are read into a processor and executed. Decoders are commonly packaged in consumer electronic devices, such as smartphones, tablet computers, gaming systems, DVD players, portable media players, and the like. They can also be packaged in consumer software applications such as video games, media players, media editors, and the like. And, of course, these components may be provided as hybrid systems with distributed functionality across dedicated hardware components and programmed general-purpose processors, as desired.

Video coders and decoders may exchange video through channels in a variety of ways. They may communicate with each other via communication channel, CH, as illustrated in FIG. 1 and FIG. 2. In still other applications, video coders may output video data to storage devices, such as electrical, magnetic and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention. Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video coding method, comprising:
    receiving an input frame, comprising pixels represented according to components of a color model;
    reshaping at least one pixel's component to generate at least one reshaped component, wherein the reshaping comprises increasing a reshaping ratio as a function of a distance between a level of the pixel's component and a predetermined neutral level of the respective component; and
    coding the components, including the at least one reshaped component, using motion compensated predictive coding.

2. The method of claim 1, wherein if the received input frame is detected to be a first frame of a scene, the reshaping comprises using scene-based reshaping to reshape the pixels of the at least once component of the components.

3. The method of claim 2, wherein the scene-based reshaping is determined based on analyses of one or more frames of the scene, the analyses comprise noise estimation, banding detection, or motion estimation.

4. The method of claim 1, wherein the reshaping the pixels comprises determining the reshaping based on one or more coding parameters of the coding.

5. The method of claim 1, wherein one or more coding parameters used in the coding is based on parameters derived from the reshaping.

6. The method of claim 1, wherein the increasing the reshaping ratio further comprises increasing the reshaping ratio as a function of a distance between a spatial location of the pixel of the pixels and a spatial location of a focus-pixel of the pixels.

7. The method of claim 6, wherein the spatial location of the focus-pixel changes with time.

8. The method of claim 6, wherein the focus-pixel comprises a plurality of focus-pixels.

9. The method of claim 1, further comprising:
    partitioning a range of pixel levels of the pixels into segments; and
    wherein the reshaping comprises segment-based reshaping, each segment-based reshaping associated with a segment of the segments and is used to reshape pixels at levels within the associated segment.

10. The method of claim 9, wherein the segment-based reshaping methods are one of piecewise linear function and piecewise non-linear function.

11. A computer system, comprising:
    at least one processor;
    at least one memory comprising instructions configured to be executed by the at least one processor to perform a method comprising:
    receiving an input frame, comprising pixels represented according to components of a color model;
    reshaping at least one pixel's component to generate at least one reshaped component, wherein the reshaping comprises increasing a reshaping ratio as a function of a distance between a level of the pixel's component and a predetermined neutral level of the respective component; and
    coding the components, including the at least one reshaped component, using motion compensated predictive coding.

12. The system of claim 11, wherein if the received input frame is detected to be a first frame of a scene, the reshaping comprises using scene-based reshaping to reshape the pixels of the at least once component of the components.

13. The system of claim 12, wherein the scene-based reshaping is determined based on analyses of one or more frames of the scene, the analyses comprise noise estimation, banding detection, or motion estimation.

14. The system of claim 11, wherein the reshaping the pixels comprises determining the reshaping based on one or more coding parameters of the coding.

15. The system of claim 11, wherein one or more coding parameters used in the coding is based on parameters derived from the reshaping.

16. The system of claim 11, wherein the increasing the reshaping ratio further comprises increasing the reshaping ratio as a function of a distance between a spatial location of the pixel of the pixels and a spatial location of a focus-pixel of the pixels.

17. The system of claim 16, wherein the spatial location of the focus-pixel changes with time.

18. The system of claim 16, wherein the focus-pixel comprises a plurality of focus-pixels.

19. The system of claim 11, further comprising:
    partitioning a range of pixel levels of the pixels into segments; and
    wherein the reshaping comprises segment-based reshaping, each segment-based reshaping associated with a segment of the segments and is used to reshape pixels at levels within the associated segment.

20. The system of claim 19, wherein the segment-based reshaping methods are one of piecewise linear function and piecewise non-linear function.

21. A non-transitory computer-readable medium comprising instructions executable by at least one processor to perform a method, the method comprising:
    receiving an input frame, comprising pixels represented according to components of a color model;

reshaping at least one pixel's component to generate at least one reshaped component, wherein the reshaping comprises increasing a reshaping ratio as a function of a distance between a level of the pixel's component and a predetermined neutral level of the respective component; and coding the components, including the at least one reshaped component, using motion compensated predictive coding.

22. The medium of claim 21, wherein if the received input frame is detected to be a first frame of a scene, the reshaping comprises using scene-based reshaping to reshape the pixels of the at least once component of the components.

23. The medium of claim 22, wherein the scene-based reshaping is determined based on analyses of one or more frames of the scene, the analyses comprise noise estimation, banding detection, or motion estimation.

24. The medium of claim 21, wherein the reshaping the pixels comprises determining the reshaping based on one or more coding parameters of the coding.

25. The medium of claim 21, wherein one or more coding parameters used in the coding is based on parameters derived from the reshaping.

26. The medium of claim 21, wherein the increasing the reshaping ratio further comprises increasing the reshaping ratio as a function of a distance between a spatial location of the pixel of the pixels and a spatial location of a focus-pixel of the pixels.

27. The medium of claim 26, wherein the spatial location of the focus-pixel changes with time.

28. The medium of claim 26, wherein the focus-pixel comprises a plurality of focus-pixels.

29. The medium of claim 21, further comprising:

partitioning a range of pixel levels of the pixels into segments; and wherein the reshaping comprises segment-based reshaping, each segment-based reshaping associated with a segment of the segments and is used to reshape pixels at levels within the associated segment.

30. The medium of claim 29, wherein the segment-based reshaping methods are one of piecewise linear function and piecewise non-linear function.

* * * * *